(12) United States Patent
Geelen et al.

(10) Patent No.: US 8,260,547 B2
(45) Date of Patent: Sep. 4, 2012

(54) NAVIGATION DEVICE INTERFACE

(75) Inventors: Pieter Geelen, Amsterdam (NL); Peter Frans Pauwels, Amsterdam (NL)

(73) Assignee: Tomtom International B.V., Amsterdam (NL)

( * ) Notice: Subject to any disclaimer, the term of this patent is extended or adjusted under 35 U.S.C. 154(b) by 522 days.

(21) Appl. No.: 12/448,821

(22) PCT Filed: Oct. 5, 2007

(86) PCT No.: PCT/EP2007/008726
§ 371 (c)(1),
(2), (4) Date: Jul. 9, 2009

(87) PCT Pub. No.: WO2008/083741
PCT Pub. Date: Jul. 17, 2008

(65) Prior Publication Data
US 2010/0094547 A1    Apr. 15, 2010

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,529, filed on Jan. 10, 2007, provisional application No. 60/879,601, filed on Jan. 10, 2007.

(51) Int. Cl.
*G01C 21/36* (2006.01)
*G06F 3/048* (2006.01)

(52) U.S. Cl. ........ 701/411; 701/428; 701/431; 345/854; 715/810

(58) Field of Classification Search .................. 701/209, 701/201, 211, 411, 428, 420, 431, 439; 345/854, 345/810; 715/810; 455/566
See application file for complete search history.

(56) References Cited

U.S. PATENT DOCUMENTS

| | | | | |
|---|---|---|---|---|
| 5,777,616 | A | * | 7/1998 | Bates et al. .................. 715/837 |
| 7,561,070 | B2 | * | 7/2009 | Rhodes et al. ........... 340/995.14 |
| 2001/0001763 | A1 | | 5/2001 | Ito |

(Continued)

FOREIGN PATENT DOCUMENTS
JP       2004-132741       4/2004

*Primary Examiner* — Tan Q Nguyen

(57) ABSTRACT

A music configuration menu shortcut is provided in a PND by software which interacts within a music menu display device. In one embodiment, A PND having a display, memory, processing capability, one or more speakers, and at least one signal reception device by which the PND can determine its approximate position globally by way of software installed on the device is disclosed. The PND performs one or more primary navigation and/or route calculation functions, as well as one or more secondary functions including the audible reproduction of digital content stored in the memory. The software also causes the display of changing graphical map information during route navigation and is capable of being caused to display one or more configuration menus to enable a user to configure various primary or secondary device operation options. In at least one embodiment, the software further provides an option for the on-screen display of a user-selectable graphical indicator during route navigation in conjunction with the changing graphical map information, selection of the indicator during navigation causing the software to display a configuration menu specific to the reproduction of digital music. In an alternative embodiment, the music menu display device includes a physical button by which one or more of the music reproduction and/or configuration menus can be caused to be displayed.

7 Claims, 4 Drawing Sheets

U.S. PATENT DOCUMENTS

| | | | |
|---|---|---|---|
| 2001/0009427 A1* | 7/2001 | Kaneko et al. | 345/854 |
| 2002/0055811 A1* | 5/2002 | Obradovich | 701/23 |
| 2006/0025920 A1* | 2/2006 | Nezu et al. | 701/200 |
| 2007/0124070 A1* | 5/2007 | Kawai et al. | 701/211 |
| 2008/0141172 A1* | 6/2008 | Yamamoto et al. | 715/835 |
| 2011/0125403 A1* | 5/2011 | Smith | 701/213 |

* cited by examiner

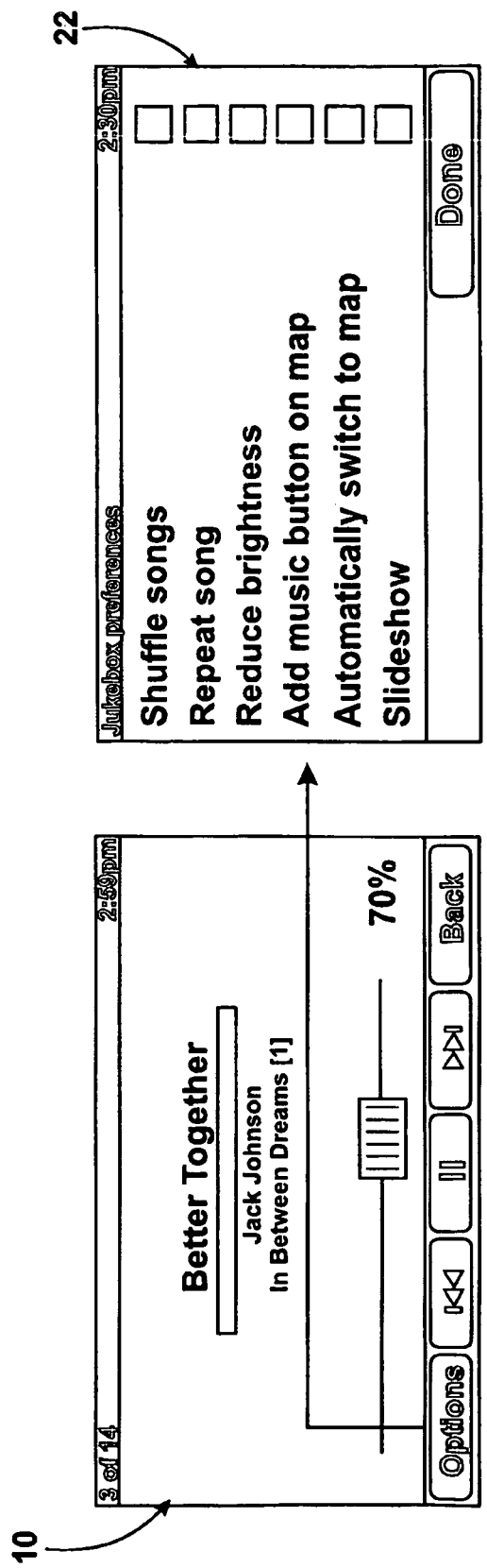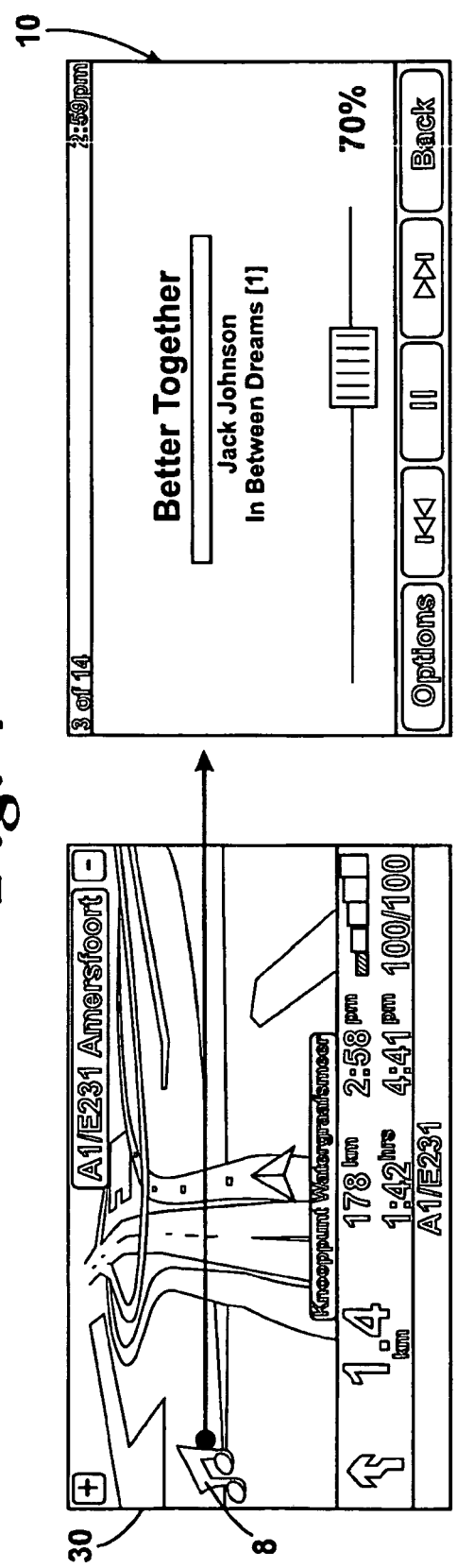
Fig. 4
Fig. 5

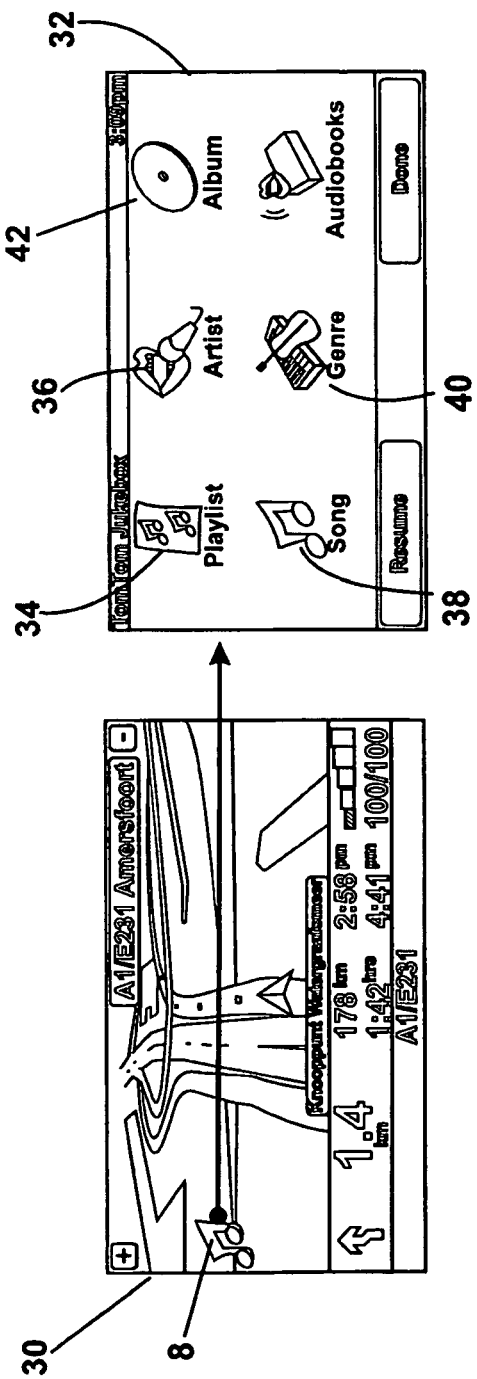
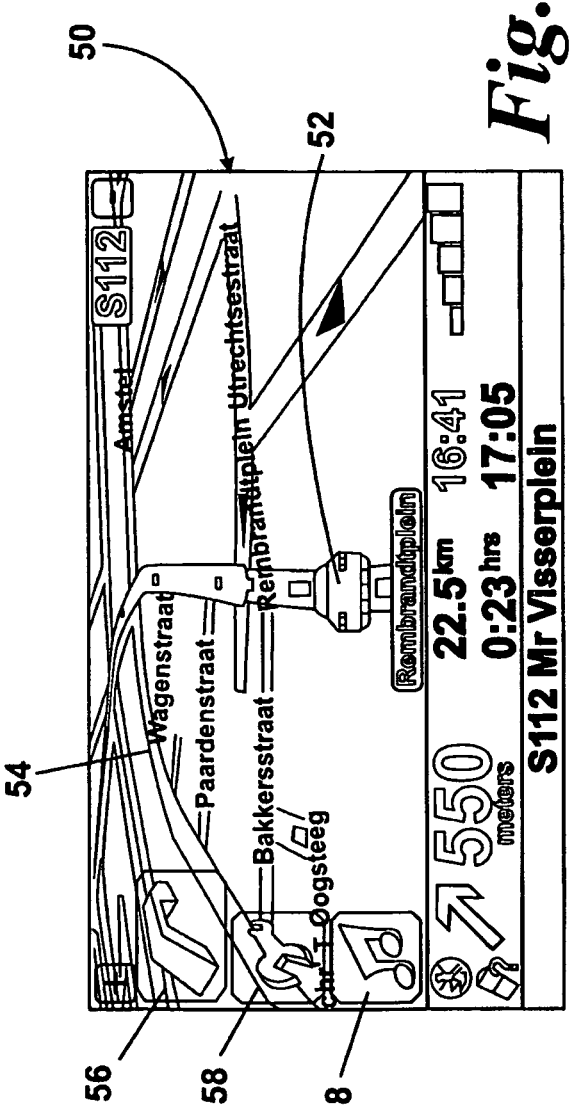
Fig. 6
Fig. 7

NAVIGATION DEVICE INTERFACE

PRIORITY STATEMENT

This application is the national phase under 35 U.S.C. § 371 of PCT International Application No. PCT/EP2007/008726 which has an International filing date of Oct. 5, 2007, which designated the United States of America, and which claims priority to U.S. Provisional Patent Application Nos. 60/879,523, 60/879,549, 60/879,553, 60/879,577, 60/879,599, 60/879,529 and 60/879,601, all filed on Jan. 10, 2007 in the United States Patent Office, the entire contents of each of which are hereby incorporated herein by reference.

This invention is concerned with an improved interface for a portable navigation device (PND).

BACKGROUND OF THE INVENTION

Portable navigation devices (PNDs) for in-car navigation are becoming increasingly widespread. They have many advantages over existing integrated or factory installed navigation systems, such arising primarily from their portability and the ease with which they can be connected to a personal computer, and can be so updated, enhanced and otherwise re-configured as the user desires.

More recent PNDs are provided with significant processing power and memory, the latter being provided as either on board RAM and ROM, and built-in or removable physical storage such as the now ubiquitous memory cards of differing proprietary varieties, e.g. SD™, CompactFlash™, Memory-Stick and the like. These enhancements render PNDs to accommodate a large amount of user-uploaded material, such as digitized video, music and other content in different formats, but primarily music in mp3 format.

The operating software of such PNDs has therefore more recently been extended to facilitate the playback of such material, particularly music, through either speakers provided as part of the device, or through remote audio apparatus with which the PND is in communication and to which the PND can stream or otherwise transmit digital content. In particular, the PND software now includes a jukebox facility whereby the user can control the manner of playback of his locally stored digital music tracks. The functionality of the jukebox facility will typically be controlled through a "preferences" menu screen displayed by the operating software of the PND at the selection of a user, such preferences facilitating organization and classification of digital music such as mp3s, and the ultimate choice of music for playback through any of a number of different means, e.g. by means of a user-set playlist, by artist, album, or genre, or by simply selecting an individual digital track being a locally stored file on the PND.

Of course, such facilities may be disabled in the case where the user has not uploaded any digital content onto the PND device, or alternatively connected a digital music (or other content) reproduction device, such an iPod® or other suitably enabled device.

It is an object of this invention to provide a means whereby the operation of a PND can be improved in the case where a user wishes to use the enhanced functionality of the device in its role as both navigation device and digital music player.

SUMMARY OF THE INVENTION

According to the present invention there is provided a PND having a display, memory, processing capability, one or more speakers, and signal reception means by means of which said PND can determine its approximate position globally by means of software installed on the device, such also performing one or more primary navigation and/or route calculation functions, as well as one or more secondary functions including the reproduction of digital content stored in said memory, said software causing the display of changing graphical map information during route navigation and being capable of being caused to display one or more configuration menus to enable a user to configure various device operation options, characterized in that the software further provides an option for the on-screen display of a user-selectable graphical indicator during route navigation in conjunction with said changing graphical map information, selection of said indicator during navigation causing the software to display a configuration menu specific to the reproduction of digital music.

Preferably, the indicator is only displayed when at least one of the following is true:

At least one or more, preferably at least 3, digital music files are stored in the memory of the device, A dedicated digital music reproduction device, such as an iPod®, is physically, wirelessly, or otherwise connected to the PND, and The software is currently performing a navigation or guidance function and simultaneously causing one of said digital music files to be reproduced.

In a preferred embodiment, the user-selectable graphical indicator is a musical note indicator, such as a crotchet, quaver, or multiples thereof.

In a most preferred embodiment, the indicator is overlayed on the graphical map information. Preferably, the indicator is at least partially transparent such that map information appearing therebeneath is not totally obscured.

Most preferably, user-selection of the indicator is achieved by touching the display, such being preferably touch-sensitive, in a region where said indicator is displayed, such action then causing the display of one or other of a first and second configuration menus specific to the reproduction of digital music, a first configuration menu being displayed when a digital music file is, at the time of indicator selection, being reproduced, and a second configuration menu being displayed when no such reproduction is at that time occurring.

Most preferably, the first configuration menu is one containing information regarding the current music file being reproduced together with one or more user-selectable options, and the second configuration menu contains one or more user-selectable options enabling one or more digital music files to be selected for immediate reproduction.

Most preferably, the first configuration menu includes a user-selectable option button which when selected results in the display of a preferences menu in which various preferences relating to the jukebox facility provided by said PND are displayed and can be altered. Most preferably said preferences menu includes one option whereby the user can choose whether to display the graphical indicator on the display during navigation or route guidance.

For the avoidance of doubt, digital music reproduction encompasses the processing of a digital music file conforming to one of any of a number of standards, such as MPEG (motion picture experts group), Windows media format, Real Audio specification, and the like, in order to listen to the music represented thereby. Most preferably however, the digital music files are "mp3" files, and their reproduction results in the PND user being able to listen to music through his PND. Furthermore, the term "memory" as used herein is intended to encompass different forms of memory, such as solid state memories, physical hard drives, flash memories, RAM, ROM, whether these be integrated, removable, replaceable, permanent, or any combination thereof.

The incorporation of this feature enhances the usability of the PND and thus increases its appeal to users.

BRIEF DESCRIPTION OF THE DRAWINGS

FIGS. 1-7 show different screen shots from a portable navigation device (PND) display demonstrating the functionality of the present invention.

DETAILED DESCRIPTION

Figure 1:
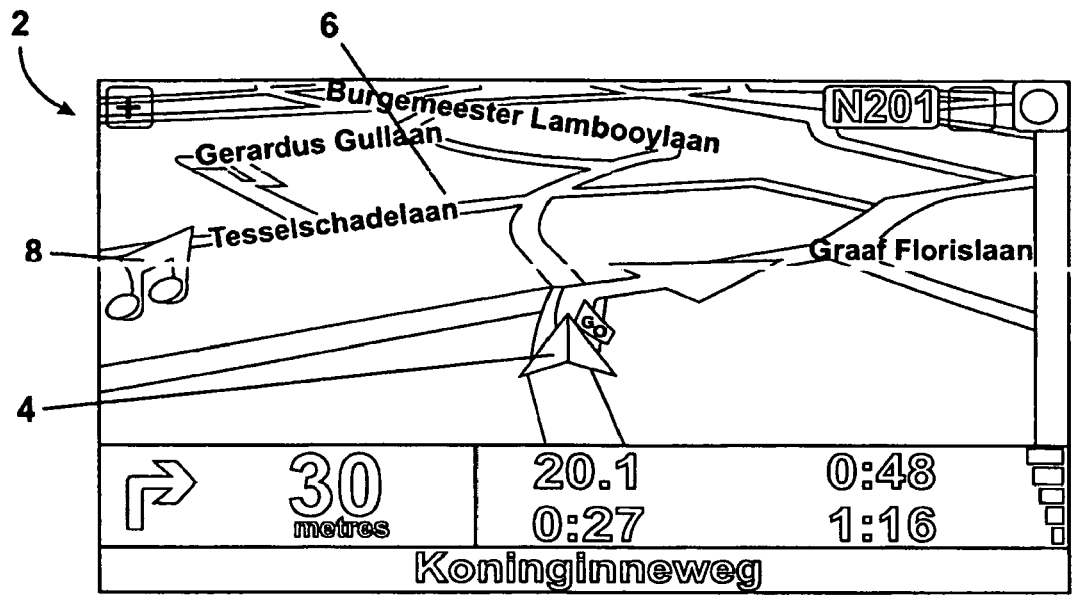

Referring firstly to FIG. 1 there is shown a screen shot 2 from the display of a suitably enabled PND device and enhanced according to the present invention. As can be seen, the screen shot is taken during route navigation being performed by the device, the current position of the device being indicated by graphical arrowhead 4, such being overlaid on graphically represented map information 6 showing various roads along which route navigation is to occur, and other roads peripheral to the desired route.

Additionally, a graphical indicator 8 being a double quaver and thus indicative of music is overlaid on the graphical map information, and is available for user selection. Of course, as the entire display of the PND is touch sensitive, the software controlling the operation of the PND is programmed to recognize when the screen is touched in the vicinity of the indicator 8, and elsewhere, each of such actions ideally causing the subsequent display of different information, menus, or configuration/operation options.

Figure 2:
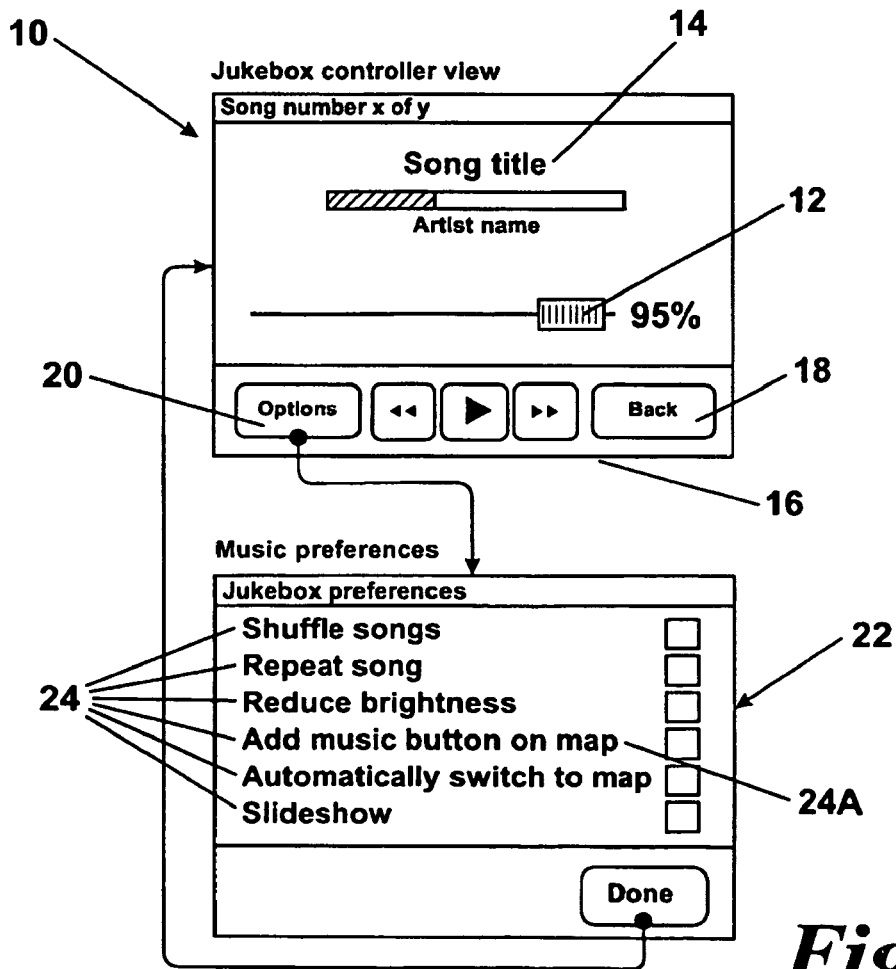

Referring now to FIG. 2, there are shown further screenshots demonstrating the jukebox functionality provided in more modern PNDs. In screenshot 10, a digital music file or track is being processed by the device and the music represented thereby will be audible through the speakers of the PND. As can be seen, a slider control 12 is provided which can be moved as desired by a user, as well as various title, artists, album and other information 14. The reproduction of the track can also be controlled using the more conventional play, rewind, and fast forward controls 16. A back button 18 is provided which when selected typically returns the display to that shown in FIG. 1 (or the previous screen), and an options button 20 causes the display of a preferences menu 22 on which a number of preferences 24 are displayed. In particular, there is an option to "Add music button on map" 24A which can be selected, and will result in the display of the indicator 8 as in FIG. 1.

Figure 3:
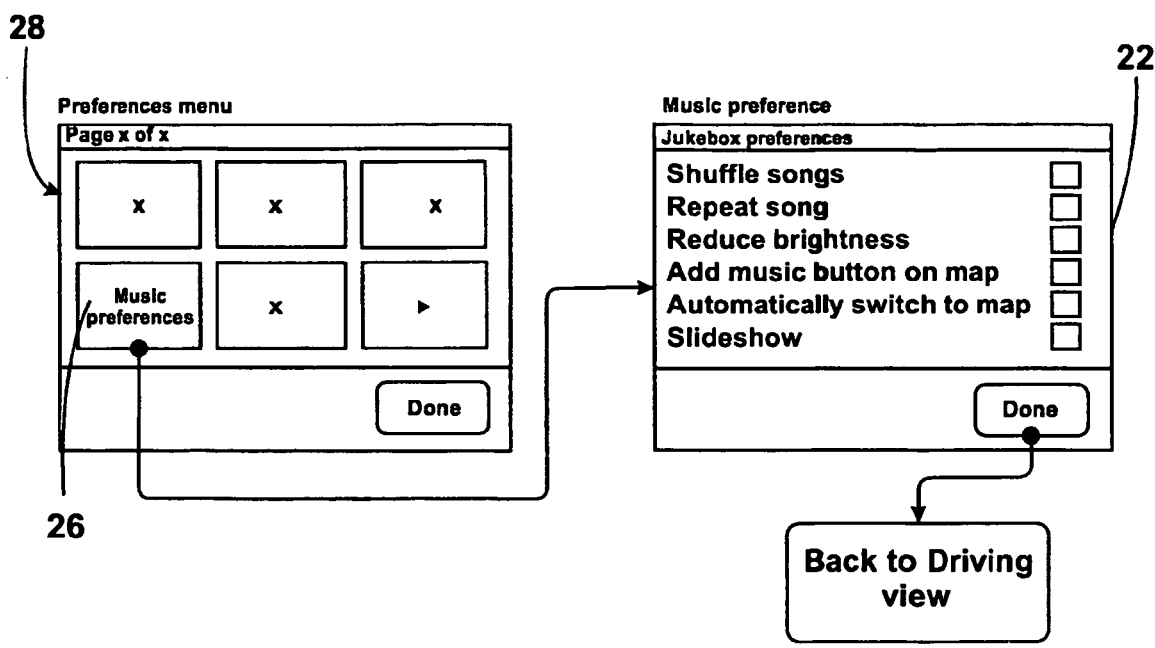

In FIG. 3, the preferences menu 22 can also be caused to be displayed by selecting a "music preferences" button 26 displayed in a superior general preferences menu 28, other buttons being displayed in this menu for accessing various other, non-music related functions and operations of the PND. It is to be mentioned that an advantage of the invention is that it essentially precludes the display of any general menu of from which a music menu may subsequently selected.

In FIG. 4, the displayed information clearly shows a music track currently being reproduced by the device, and the screen shot shown is a specific example of the generic screen shot 10 shown in FIG. 2.

In FIG. 5, a screen shot 30 is shown similar to that of FIG. 1, and the indicator icon 8 is shown partially transparent so as not to obscure the graphical map information beneath. Also, this figure demonstrates that the selection of the music icon 8 causes the display of the track reproduction screen 10 immediately, as opposed to the user being presented with a cascading hierarchy of menu screens, which will ultimately lead the user to the screen 10.

In a preferred embodiment, the display of the track reproduction screen 10 demonstrated in FIG. 5 is only effected while a track is currently being reproduced or played back through the device. If this is not currently occurring, then user selection of the graphical indicator causes a different menu screen 32 to be displayed, as can be seen in FIG. 6. In screen 32, the user is presented with a variety of different track selection and playback options, any of the digital music tracks stored on the device being selectable as part of a user-created playlist 34, by artist name 36, by individual track name 38, by genre 40, or in terms of the album 42 on which particular tracks are released.

In a particularly preferred embodiment shown in FIG. 7, a screen shot 50 is shown during route navigation, the current position being indicated by a car icon 52 overlaid on graphical map information 54. A music indicator 8 is provided, and preferably one or more further indicators 56, 58 are additionally displayed, such providing menu shortcuts to specific menu screens broadly represented or suggested by the indicator displayed. For example the indicator 56 is a telephone, and selection thereof automatically causes display of a configuration menu for the interaction between the PND and a mobile telephone (not shown), for example, or other suitable menu screen which would only normally be displayed by the user navigating through the conventional, software programmed menu structure of the device. Indicator 58, include the icon of a spanner, may similarly provide a menu shortcut to the device settings menu.

A method of operating a PND, including various method steps identified above and in the claims, is also contemplated within the scope of the application, as is a computer program.

The invention claimed is:

1. A portable navigation device (PND) comprising:
    a touch sensitive display;
    a memory;
    a processor;
    at least one signal reception device to receive signals useable to determine an approximate global position of the PND in conjunction with software installed on the PND, the software also being configured to:
        perform at least one of one or more primary navigation and route calculation functions, and one or more secondary functions including the audible reproduction of digital content stored in said memory, said digital content including at least one digital music file; and
        cause the display to display changing graphical map information during navigation in conjunction with a user-selectable graphical indictor on a navigation screen,
    wherein selection of the user-selectable graphical indicator during navigation by a user touching the display in a region where the user-selectable graphical indicator is displayed causes the software to cause the display to display one or other of a first and second configuration menu screen specific to the audible reproduction of the stored digital content based on whether a digital music file is being reproduced at the time the graphical indicator is selected.

2. A PND according to claim 1, wherein the user-selectable graphical indicator is a musical note indicator.

3. A PND according to claim 1, wherein the user-selectable graphical indicator is overlaid on the map information displayed on the navigation screen, and is at least partially transparent such that the map information is viewable therebeneath.

4. A PND according to claim 1, wherein the first configuration menu screen is displayed when a digital music file is being reproduced at the time the graphical indicator is selected and contains information regarding the digital music file being reproduced together with one or more user-selectable options, and the second configuration menu screen is displayed when a digital music file is not being reproduced at the time the graphical indicator is selected and contains one or more user-selectable options enabling one or more digital music files to be selected for immediate reproduction.

5. A PND according to claim 4, wherein the first configuration menu screen includes a user-selectable option button which, when selected, results in the display of a preferences menu on the display, in which various preferences relating to the digital music reproduction facility provided by the PND are displayed on the display.

6. A method of operating a portable navigation device (PND) including a touch sensitive display, a memory, a processor, and at least one signal reception device to receive signals useable to determine an approximate global position of the PND, the method comprising:
   performing at least one of one or more primary navigation and route calculation functions on the PND;
   performing one or more secondary functions on the PND including the audible reproduction of digital content stored in the memory, said digital content including at least one digital music file; and
   causing the display to display changing graphical map information during navigation in conjunction with a user-selectable graphical indicator on a navigation screen;
   wherein selection of the user-selectable graphical indicator during navigation by a user touching the display in a region where the user-selectable graphical indicator is displayed causes the display to display one or other of a first and second configuration menu screen specific to the audible reproduction of the stored digital content based on whether a digital music file is being reproduced at the time the graphical indicator is selected.

7. A non-transient computer readable medium including program segments for, when executed on a portable navigation device (PND) causing the PND to implement the method of claim 6, wherein the PND comprises:
   a touch sensitive display,
   a memory, a processor, and
   at least one signal reception device to receive signals useable to determine an approximate global position of the PND.

* * * * *